(12) United States Patent  (10) Patent No.: US 8,792,744 B2
Conger et al.  (45) Date of Patent: Jul. 29, 2014

(54) GENERALIZED MULTISCALE SEAM CARVING FRAMEWORK

(71) Applicant: Board of Trustees of Michigan State University, East Lansing, MI (US)

(72) Inventors: David Conger, Grosse Pointe Woods, MI (US); Hayder Radha, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 176 days.

(21) Appl. No.: 13/633,386

(22) Filed: Oct. 2, 2012

(65) Prior Publication Data

US 2013/0084020 A1  Apr. 4, 2013

Related U.S. Application Data

(60) Provisional application No. 61/542,530, filed on Oct. 3, 2011.

(51) Int. Cl.
*G06K 9/40* (2006.01)
*G06T 3/00* (2006.01)

(52) U.S. Cl.
CPC ................... *G06T 3/0012* (2013.01)
USPC .......................... 382/260; 382/298

(58) Field of Classification Search
USPC .......................... 382/260, 298; 715/252, 800
See application file for complete search history.

(56) References Cited

U.S. PATENT DOCUMENTS

| | | | |
|---|---|---|---|
| 7,477,800 B2 | 1/2009 | Avidan et al. | |
| 7,747,107 B2 | 6/2010 | Avidan et al. | |
| 7,873,211 B1 | 1/2011 | Grundmann et al. | |
| 2010/0027876 A1* | 2/2010 | Avidan et al. | 382/162 |
| 2010/0142853 A1 | 6/2010 | Fillion et al. | |
| 2010/0328352 A1 | 12/2010 | Shamir et al. | |
| 2011/0038529 A1 | 2/2011 | Utsugi et al. | |

OTHER PUBLICATIONS

S. Avidan et al "Seam Carving for Content-Aware Image Resizing", ACM Transactions on Graphics, vol. 26, No. 3 (Jul. 2007).*
R. Acanta et al "Saliency Detection for Content-Aware Image Resizing", IEEE International Conference on Computer Vision and Pattern Recognition (2009).*
Z. Liu et al "Adaptive Image Retargeting Using Saliency-Based Continuous Seam Carving", Optical Engineering, vol. 49(1) Jan. 2010.*
J. Han et al "Wavelet Based Seam Carving for Content-Aware Image Resizing", ICIP 2009.*

* cited by examiner

*Primary Examiner* — Gregory F Cunningham
(74) *Attorney, Agent, or Firm* — Harness, Dickey & Pierce, P.L.C.

(57) ABSTRACT

A computer-implemented method for resizing an image using a seam carving algorithm. The method may include measuring energy levels of pixels in an original image to derive an original energy map; applying a filter to an original energy map to derive a first energy map having a scale less than the original energy map; iteratively applying the filter N times, starting with the first energy map, to an energy map from an immediately preceding iteration; upsampling each of the energy maps to a resolution that matches the original energy map; combining the upsampled energy maps with the original energy map to form a composite image; identifying a seam by finding a path in the composite image having lowest energy quantities from one end of the composite image to an opposing end of the composite image; and selectively deleting the identified seam from the original image, thereby yielding a resized image.

20 Claims, 7 Drawing Sheets

GENERALIZED MULTISCALE SEAM CARVING FRAMEWORK

CROSS-REFERENCE TO RELATED APPLICATIONS

This application claims the benefit of U.S. Provisional Application No. 61/542,530, filed on Oct. 3, 2011. The entire disclosure of the above application is incorporated herein by reference.

FIELD

The present disclosure relates to an improved method for resizing an image using a seam carving technique.

BACKGROUND

As widespread use of mobile media devices continues to increase, there remains a pressing desire for an effective means of resizing images to fit arbitrary screen sizes. Traditional methods such as cropping or resampling either remove important image features or introduce significant visual distortion. Initially, a content-aware image resizing technique called seam carving that iteratively removes/adds connected paths of pixels to achieve a desired target size. This was followed by the development of several other techniques which employed global resizing rather than the iterative method used in seam carving. While these techniques produced good results, they are less scalable—an image must be reprocessed for each resolution change. Seam carving on the other hand enables one to store the locations of all seam paths removed/added in achieving some minimum/maximum resolution, allowing any resolution in between to be achieved by simply recalling the path locations and removing/repeating those pixels. For this reason and others, seam carving remains an effective image resizing tool. Although there has been improvement on the original seam carving technique (as well as extending it to video), there are still cases where seam carving has problems.

Many of the problems with traditional seam carving occur when multiple objects and/or textures exist within the image. Often the seam carving algorithm will misinterpret the energy data, conclude that a seam is unimportant, and remove a seam that actually is a portion of the main object in the image. This results in the removal or distortion of important features in the image. The present disclosure solves this problem by highlighting the important objects in the image and removing seams that do not interfere with the display of these objects.

This section provides background information related to the present disclosure which is not necessarily prior art.

SUMMARY

A computer-implemented method is provided for resizing an image using a seam carving algorithm. The method may include: measuring energy levels of pixels in an original image to derive an original energy map; applying a filter to an original energy map to derive a first energy map having a scale less than the original energy map; iteratively applying the filter N times, starting with the first energy map, to an energy map from an immediately preceding iteration; upsampling each of the energy maps to a resolution that matches the original energy map; combining the upsampled energy maps with the original energy map to form a composite image; identifying a seam by finding a path in the composite image having lowest energy quantities from one end of the composite image to an opposing end of the composite image; and selectively deleting the identified seam from the original image, thereby yielding a resized image. The steps of identifying a seam and selectively deleting the identified seam may be repeated until the resized image is a desired resolution. The resized image may be displayed on a display of the computing device.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
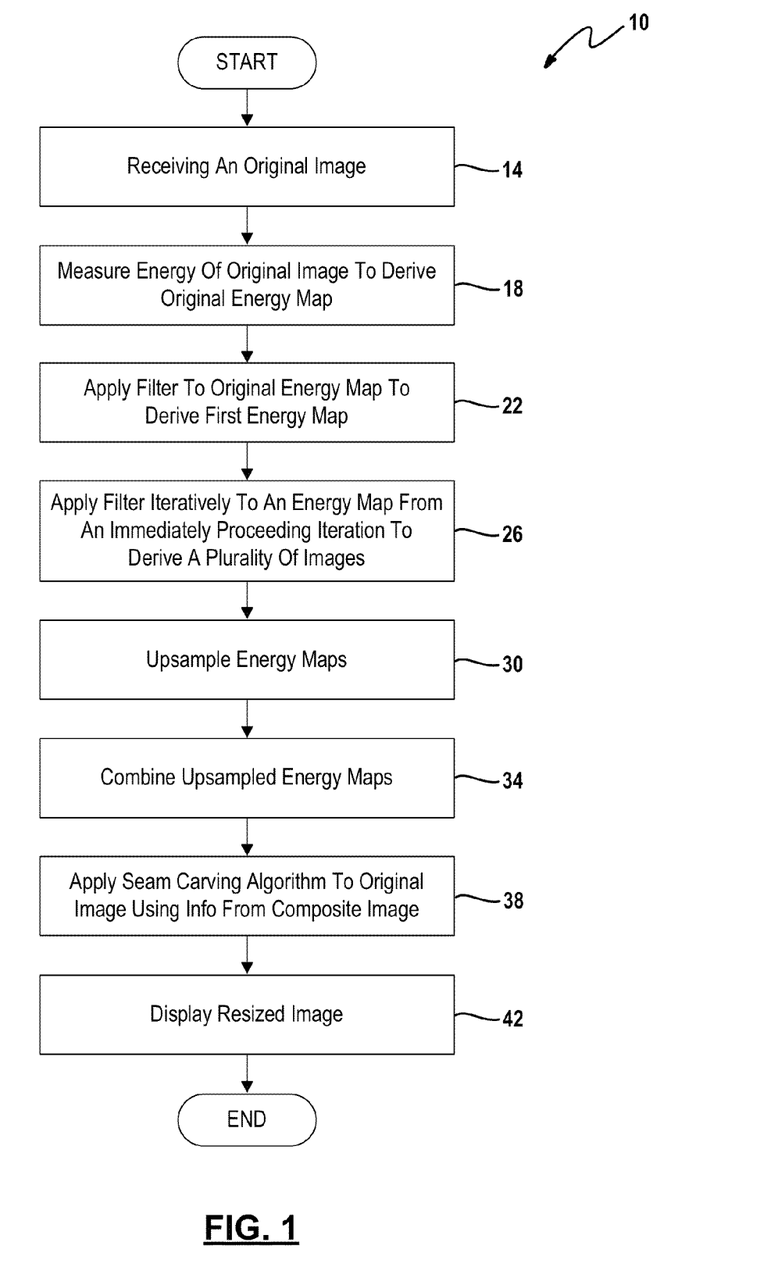
FIG. 1 is a flow diagram of a computer-implemented method for resizing an image using a seam carving technique according to the present disclosure.

FIG. 1 is a flow diagram of a computer-implemented method for resizing an image using a seam carving algorithm according to the present disclosure and is now described in further detail. A computer-implemented method 10 for resizing an image using a seam carving technique begins at 14 by receiving an original image. At 18, the method 10 measures the energy of the pixels in the original image to derive an original energy map. The energy map displays the energy of the pixels in relation to one another based on texture and objects within the image. The higher energy pixels occur where there are transitions between objects or textures within the image. For example only, the pixels comprising an outline, or edge, of a solid-colored horse in a picture will have much higher energy than the pixels comprising an interior of the horse. At 22, the method 10 applies a filter to the original energy map and derives a first energy map that has a scale less than the original image. The filter may be a wavelet transform, a high pass filter, a low pass filter, a Gabor filter, a Roberts mask, or any other filter known to one skilled in the art. For example only, the wavelet transform may apply a high pass filter to the original energy map resulting in the first energy map displaying only an edge of each object in the original image. The filter might also be a backward-energy seam carving filter or a forward-energy seam carving filter which will be described in detail later.

At 26, the method 10 iteratively applies the filter to the energy map from the immediately preceding iteration beginning with the first energy map. For example only, the filter is applied to the original energy map to derive a first energy map having a different scale than the original energy map. The same filter is applied to the first energy map to derive a second energy map having a scale different than both the first energy map and the original energy map. The filtering process may continue to be applied in an iterative manner to derive a plurality of energy maps. The filter applied to the second, third, etc., energy maps will be the same filter that was selected to derive the first energy map. Each energy map will be a different scale from all of the previously derived energy maps.

At 30, the method 10 upsamples the energy maps and, at 34, the upsampled energy maps are combined to form a composite image. For example only, the second energy map, or a lowest resolution energy map, is upsampled by doubling its resolution and applying an averaging filter to form an upsampled energy map. The upsampled energy map is mathematically summed with the first energy map, or a next lowest resolution map, to form a combined energy map. A resolution of the combined energy map is doubled and the averaging filter is applied to form an upsampled combined energy map. The upsampled combined energy map is then mathematically summed with the original energy map to form the composite image. Further details of this method are described later in the description relating to FIG. 6.

At 38, a seam carving algorithm is applied to the original image using data from the composite image. The seam carving algorithm evaluates the composite image for high energy pixels, selects a seam for deletion, and deletes the selected seam from the original image. A seam is defined as an 8-connected path of pixels from either top to bottom (vertical seam) or left to right (horizontal seam). In order to maintain an image's rectangular shape, a seam contains exactly one pixel per row (vertical seam) or per column (horizontal seam). The optimum path is generated using the composite image from above and traversing from the bottom edge (or right edge) back to the top edge (or left edge), maintaining a connected path and selecting the minimum value at each row (or column). This path of pixels is the seam and is removed from the original image. The process then starts over, continuing until the desired resolution is met. While there are several seam carving operations—vertical seam removal/insertion, horizontal seam removal/insertion, combined vertical and horizontal seam removal/insertion—they are all based on the process of identifying a single seam. Therefore, for the sake of brevity, development of the model will be based on the selection of vertical seams only, but can be easily extended to the other listed operations. Further details regarding the exemplary seam carving algorithm may be found in "Seam Carving for Content-Aware Image Resizing," by S. Avidan and A. Shamir, *ACM Transactions on Graphics*, 2007, Vol. 26, No. 3 which is incorporated herein by reference in its entirety.

At 42, the method 10 displays a resized image on an image displaying device. For example only, the image displaying device could be a cell phone, computer, digital picture frame, television, or any other image displaying device known in the art.

While the present disclosure describes removing seams from the original image, the exemplary embodiment could also insert seams into the original image.

The mathematical analysis relating to the flow diagram of the present disclosure is now described. In FIG. 1, a filter is applied to the original energy map in 22. The framework of the filter bank can be described as follows. Formally, let $B=\{W^k\}_{0 \leq k \leq K}$ be a filter bank where $\{W^k\}$ is an h×w mask. The result of filtering an m×n image f with the mask can be defined as $$d^k(x, y) = \sum_{i=-w/2}^{w/2} \sum_{j=-h/2}^{h/2} f(x+i, y+j) W^k(i, j)$$

which is referred to as the k-th subband (or coefficient map). Note that this is the cross-correlation of f and $W^k$ and not a convolution—a crucial distinction for the forward-energy seam carving implementation later defined.

Each coefficient map $d^k$ provides information about a particular image feature based on the structure of the mask $W^k$. Image neighborhoods resembling the mask will result in large coefficient values while other neighborhoods will not. This leads to the idea that different combinations of coefficient maps can be used depending on the direction of a seam. Due to the nature of 8-connected paths, a seam can travel in one of three ways at each stop on its journey from edge to edge. For a vertical seam, the seam at each row can move down to the right, straight down, or down to the left. Therefore, it is possible to "consult" different coefficient maps for different directions. For convenience, vector products are used to describe this discretionary ability. Define:

$$D_{i,j} \triangleq q([d^0(i,j), d^1(i,j), \ldots, d^K(i,j)])$$

where q is an element-wise operator used for normalization. Unless otherwise stated, q is defined based on the L1-norm:

$$(q(A))_{i,j} \triangleq |a_{i,j}|$$

where $a_{i,j}$ is the i,j-th element of the matrix A. This normalization is used to ensure that coefficients do not cancel and essentially typifies the energy metric.

How and when the different coefficient maps are used comes into play during the generation of the composite image, also referred to as a cumulative energy map M(i,j), generalized here for vertical seam removal:

$$M(i, j) = \min \begin{cases} M(i-1, j-1) + D_{i,j}\rho_R \\ M(i-1, j) + D_{i,j}\rho_C \\ M(i-1, j+1) + D_{i,j}\rho_L \end{cases}$$

where $\rho_R$, $\rho_c$ and $\rho_l$, are K×1 vectors whose k-th elements define the weighting factor of the k-th coefficient map. Essentially, these guidance vectors designate which coefficient maps are used in "steering" a seam down to the right, straight down or down to the left, respectively. The cumulative energy map can be defined similarly for horizontal seam removal; however, as mentioned above this discussion will be limited to the vertical case.

In FIG. 1, a filter is iteratively applied to the energy map from an immediately preceeding iteration to derive a plurality of images which are then combined to form a composite image (or cumulative energy map). As stated earlier, the filter might be the backward-energy seam carving filter or the forward-energy seam carving filter. The backward-energy seam carving filter was used in the original seam carving algorithm. The original seam carving algorithm uses only a single energy map—primarily the L1-norm of the image gradient—to generate the cumulative energy map M. As there is more than one way to implement the gradient for discrete-time signals (for example only a Sobel filter, a Prewitt filter, or a Scharr filter), the backward-energy filter bank is defined in terms of general derivative masks for the vertical ($H_V$) and horizontal ($H_H$) directions:

$$B_{back} = \{H_V, H_H\}$$

with $\rho_R = \rho_C = \rho_L = [1,1]^T \underline{\Delta}\rho$. One can easily verify that $$D_{i,j}\rho = |d^0(i,j)| + |d^1(i,j)|$$

which is the L1-norm of the image gradient at the point (i,j). Notice that since $\rho_R = \rho_C = \rho_L$, there is no distinction between the coefficient maps for different seam directions.

The forward-energy seam carving algorithm is described in terms of the absolute pixel differences between disjoint pixels brought together by seam removal. Specifically, this is implemented directly into the definition of the cumulative energy map for vertical seam removal.

$$M(i,j) = \min \begin{Bmatrix} M(i-1, j-1) + C_R(i,j) + C_C(i,j) \\ M(i-1, j) + C_C(i,j) \\ M(i-1, j+1) + C_L(i,j) + C_C(i,j) \end{Bmatrix}$$

where $$C_R(i,j) = |f(i-1,j) - f(i,j-1)|$$

$$C_C(i,j) = |f(i,j+1) - f(i,j-1)|$$

$$C_L(i,j) = |f(i-1,j) - f(i,j+1)|$$

This leads to the forward-energy seam carving filter bank $$B_{fwd} = \left\{ \begin{bmatrix} 0 & -1 & 0 \\ 1 & 0 & 0 \\ 0 & 0 & 0 \end{bmatrix}, \begin{bmatrix} 0 & 0 & 0 \\ 1 & 0 & -1 \\ 0 & 0 & 0 \end{bmatrix}, \begin{bmatrix} 0 & 1 & 0 \\ 0 & 0 & -1 \\ 0 & 0 & 0 \end{bmatrix} \right\}$$

with $$\rho_R = [1, 1, 0]^T$$

$$\rho_C = [0, 1, 0]^T$$

$$\rho_L = [0, 1, 1]^T$$

One can easily verify that $$D_{i,j}\rho_R = |d^0(i,j)| + |d^1(i,j)| = C_R(i,j) + C_C(i,j)$$

$$D_{i,j}\rho_C = |d^1(i,j)| = C_C(i,j)$$

$$D_{i,j}\rho_L = |d^1(i,j)| + |d^2(i,j)| = C_C(i,j) + C_L(i,j)$$

Having redefined forward-energy seam carving, one can see that it essentially combines shifted Roberts masks with a simple 1D difference mask. The Roberts masks discourage seams from passing through diagonal edges, while the simple difference mask discourages seams from passing through vertical edges. This observation naturally prompts the use of other seam carving filters, and while there are many possibilities, due to space limitations only a few specific cases are highlighted. Another observation gleaned from the multiscale seam carving model is that the guidance vectors can take on different weights to produce interesting results.

Figure 3A:
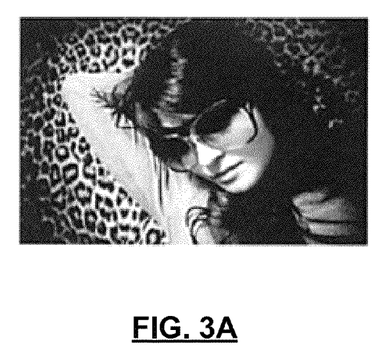
FIGS. 3A-3D are illustrations of an original image, a traditional seam carved image, an energy map, and an image seam carved according to the present disclosure, respectively.
Figure 3B:
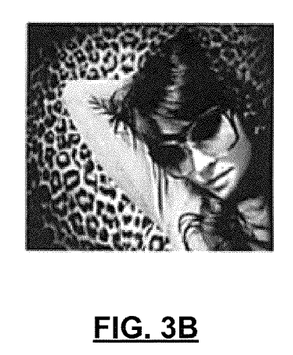
Figure 3C:
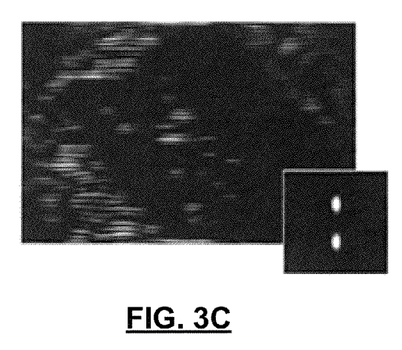
Figure 3D:
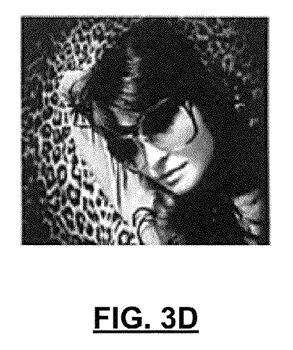
Figure 4A:
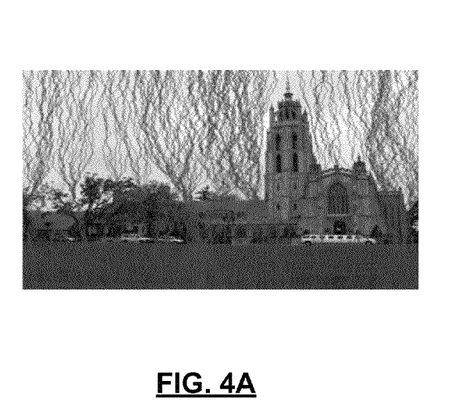
FIGS. 4A-4D are illustrations of two different examples of seam carved images according to the present disclosure.
Figure 4B:
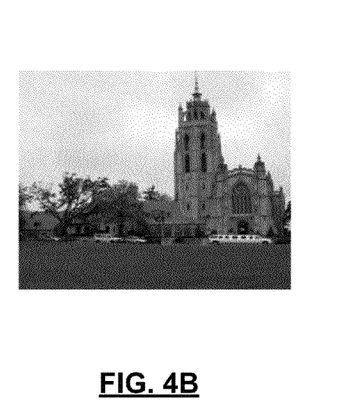
Figure 4C:
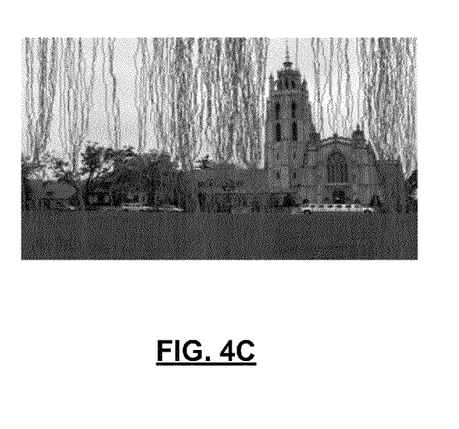
Figure 4D:
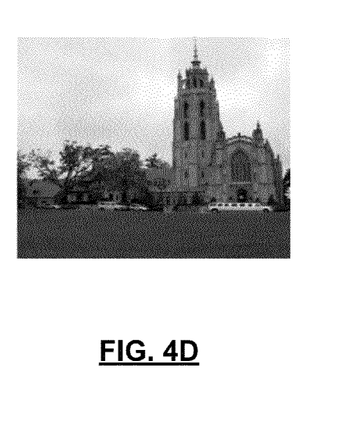

One type of filter that may be used is the Gabor filter. A significant problem with seam carving is its sensitivity to texture. Often there may be an image that contains a relatively smooth object set against a busy texture such as in FIG. 3(a). Using seam carving, the texture is mostly avoided and many seams pass through the person's hair and face, causing significant distortion (FIG. 3(b)). One way to address this problem is in terms of scale. Another approach is through the use of filters which are sensitive to texture, such as Laws' texture masks or Gabor filters. For the example, in FIG. 3, a Gabor filter with 90° phase, one octave bandwidth, and a center frequency of $\sqrt{(2)}/2^4$ (FIG. 3(c)) was used—let $G_1$ be the mask associated with this filter. By augmenting this onto the forward-energy filters (i.e., $B = B_{fwd} \cup \{G_1\}$) and assigning it negative weight for diagonal directions, i.e., $$\rho_R = [1,1,0,-1]^T \rho_C = [0,1,0,0]^T \rho_L = [0,1,1,-1]^T$$

the seams can be guided through the texture and mostly avoid the person (FIG. 3(d)). Of course, there are other Gabor filters that could have been used, but this example is mainly meant to illustrate how incorporating a texture filter can improve the results.

As stated above, the Roberts masks can also be used as an alternative to the forward-energy filters. Here, the goal is more about using simple filters than necessarily improving the results. Formally, define $$B_{Roberts} = \left\{ \begin{bmatrix} 0 & -1 \\ 1 & 0 \end{bmatrix}, \begin{bmatrix} 1 & 0 \\ 0 & -1 \end{bmatrix} \right\}$$

with guidance vectors $$\rho_R = [3,1]^T \rho_C = [1,1]^T \rho_L = [1,3]^T$$

which are based on those used for the forward-energy case—if the following is defined $$C_R = |d^0|$$

$$C_C = |d^0|/2 + |d^1|/2$$

$$C_L = |d^1|$$

$$D_{i,j}\rho_R = 3|d^0(i,j)| + |d^1(i,j)| = 2C_R(i,j) + 2C_C(i,j)$$

$$D_{i,j}\rho_C = |d^0(i,j)| + |d^1(i,j)| = 2C_C(i,j)$$

$$D_{i,j}\rho_R = |d^0(i,j)| + 3|d^1(i,j)| = 2C_C(i,j) + 2C_L(i,j)$$

Despite their simplicity, these filters work quite well, comparable to $B_{fwd}$ and sometimes even superior.

Guidance vectors control the weighting for each subband for a given direction. For general seam carving, they will usually be designed like the ones defined above. However, there may be cases where one might want to bias a particular direction. For example, compression methods using seam carving have been proposed which involve storing the seam path locations. By increasing the center bias, the seams will be straighter and thus decrease their entropy. While this may lead to a less optimal solution in terms of the forward-energy criterion, it may still produce comparable results—and possibly better if the image contains objects with straight edges (cf. FIG. 3).

Figure 5:
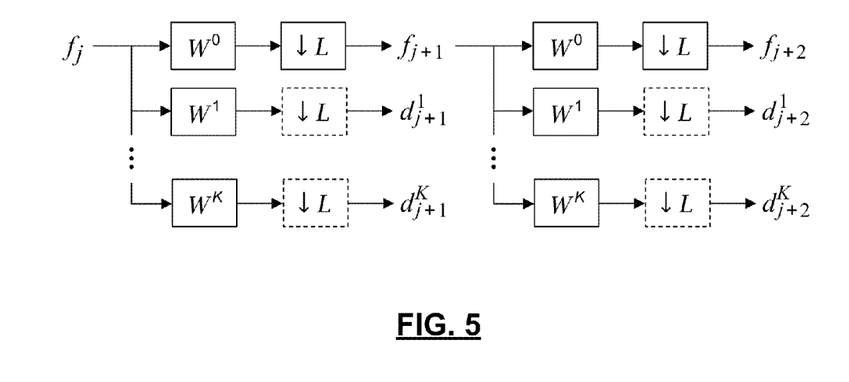
FIG. 5 is a diagram depicting an exemplary cascaded filter bank for multiscale analysis.

The cascaded filter bank for multiscale analysis is described as shown in FIG. 5. At each level j, the image $f_j$ is passed through the filters $\{W^k\}_{0 \leq k \leq K}$. The output of the cross-correlation of $f_j$ with $W^0$ is downsampled by L in both dimensions to produce $f_{j+1}$ which can then be filtered at the next level. Formally, $$f_{j+1}(x, y) = \sum_{a=-w/2}^{w/2} \sum_{b=-h/2}^{h/2} f_j(Lx + a, Ly + b) W^0(a, b)$$

Thus, $W^0$ would assumeably be chosen as a low-pass filter and L should be chosen accordingly based on the type of low-pass filter. For example, if $W^0$ is a simple 3×3 average, then an appropriate choice for the scale factor would be L=3. Primarily, L=2 has been used in simulations, with the exception of $B_{fwd}$ and $B_{back}$ back for which L=3 was used.

The outputs of the remaining filters are the coefficient maps and can be optionally downsampled depending on the desired implementation. For example, to faithfully implement any form of the original seam carving algorithm for a single scale, downsampling should not be done. Without downsampling, this multiscale model is essentially the decimated à trous algorithm. For more information on the decimated à trous algorithm, please reference "The discrete wavelet transform: Wedding the à trous and Mallat algorithms," by M. J. Shensa, *IEEE Trans. Signal Processing,* 1992, Vol. 40, No. 10. Usually, the à trous algorithm is presented in the context of wavelets with dyadic scaling, but here, no formal requirements are made on the filter bank or scale factor. If downsampling is implemented, this model is very similar to the discrete wavelet transform, but again generalized to any filter bank. It is also important to see that there are several other possible variations of this model. For instance, one could use the normal à trous algorithm, which upsamples the filters at each level rather than downsampling the low pass output. This would lead to improved space localization since the filtered outputs at every level would be of the same dimension; yet, such precision does not guarantee better results. Rather, the spatial location uncertainty associated with decimation has been found to be beneficial. Generally speaking, if an image location is significant, it makes sense for a seam to avoid a larger neighborhood around that location, not just that single pixel. This has the effect of ensuring that seams stay some distance away from important features as much as possible. Overall it has been found that the Roberts filters (at around five levels) and the forward-energy filters (at around three to four levels) produce the best results.

Having filtered the image using the cascaded filter bank, the challenge of utilizing the information across multiple scales in some meaningful way is now described. Up to this point no explicit requirements that $W^0$ be a low-pass filter or that the remaining masks be high-pass filters (or bandpass filters covering higher frequencies) have been made; however, to facilitate the discussion, it will be assumed that this is the case from here on out. At each scale, the high-pass coefficient maps characterize the energy of the different features corresponding to each filter. Finer scales represent the fine details of an image—the highest frequency content—while coarser scales represent broader changes in the image. Consequently, the finest scales will be more susceptible to fine textures and noise which may be visually unimportant.

Figure 2A:
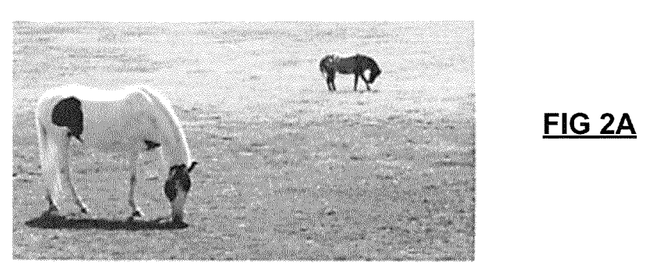
FIGS. 2A-2C are illustrations of an original image, a traditional seam carved image, and an image seam carved according the present disclosure, respectively.
Figure 2B:
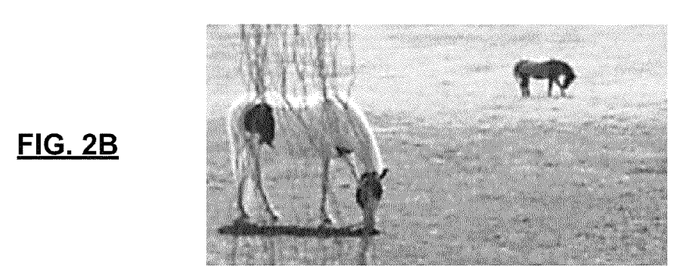
Figure 2C:
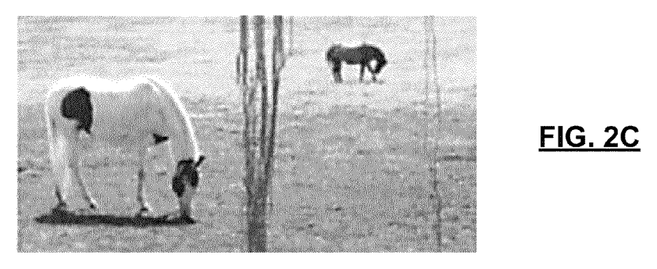

This is exactly the case in FIG. 2(*b*)—the horse is much smoother than the grass and therefore makes for a less resistant path. Even though the edges of the horse produce high energy, it is not enough to make the cumulative path energy higher than a path through the grassy region. As discussed above, conventional seam carving methods have the tendency to weigh the fine details too heavily. On the other hand, it neither makes sense to give a lot of weight to the coarse details. Still, the goal is to give weight to significant edges and, as it is well known, such edges will span several scales. In particular, it is well-established that edges appear across scales as modulus maxima, with the finest scale giving the precise location of the edge. As the scale increases, the edge diffuses. Consider the two different image regions taken from the horse image of FIG. 2. As the scale increases, the coefficients for the grassy region quickly decay, becoming nearly zero. In contrast, the coefficients for the region containing the horse's head are significant at all four scales.

Figure 6:
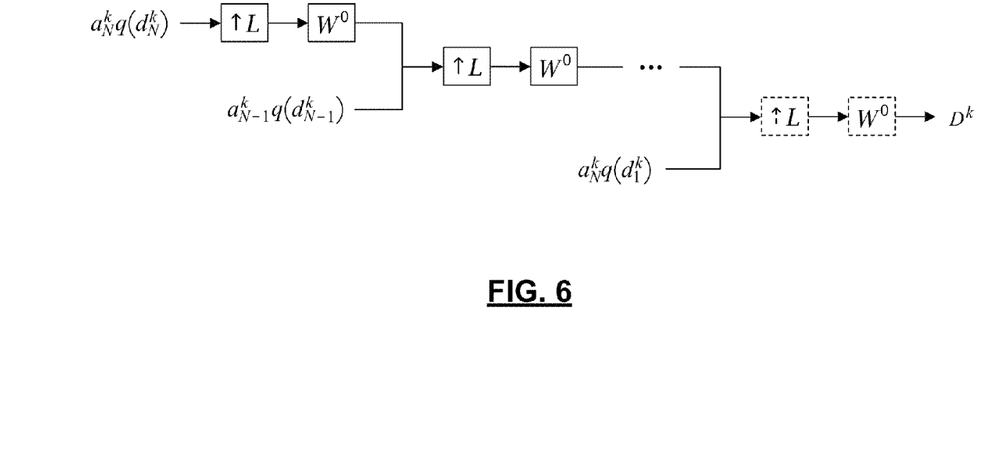
FIG. 6 is a diagram depicting an exemplary technique for combining energy maps according to the present disclosure.

This brings back the challenge of combining the information across scales to form the cumulative energy map (or composite image) as performed by upsampling the energy maps in 30 and linearly combining the upsampled energy maps in 34 of FIG. 1. There are many ways to combine the information; however, a simple linear combination of the coefficient maps works quite well. The one challenge, of course, is that a coefficient map at level j is L times the size of one at level j+1 and therefore must be upsampled. This is implemented as shown in FIG. 6. At each level, the coefficient map $d_j$ is normalized using q, weighted by $a_j$, upsampled in both dimensions by L, low-pass filtered, and added to the weighted, normalized coefficient map at level j−1. Formally, the combination of levels j and j−1 can be expressed as $$\overline{d_{j-1}}(x, y) = \sum_{a=-w/2}^{w/2} \sum_{b=-h/2}^{h/2} \overline{d_j}\left(\frac{x+a}{L}, \frac{y+b}{L}\right) W(a, b)$$

where $\overline{d_j} \triangleq a_j q(d_j)$. If downsampling was implemented in the cascaded filter bank (see FIG. 6*a*), then upsampling and filtering at the last level must be done to ensure that the output matches the size of the image f. The final map $D^k$ is referred to as the energy accumulation map corresponding to the filter $W^k$. Since it represents N scales of the coefficient map $d^k$, $D_{i,j}$ can now be redefined.

$$D_{i,j} \triangleq [D^0(i, j), D^1(i, j), \ldots, D^K(i, j)]$$

Note that the normalization function q is absent in this definition since it was included in the generation of the energy accumulation map.

While this may appear to be a fairly rigid method of utilizing the energy across scales, there are a few things that give it some flexibility. First, while there are no hard and fast rules on the number of levels N, the practical limit is given by $$N \leq \left\lfloor \frac{\log(\min\{m, n\}) - \log(\min\{h, w\} - 1)}{\log L} \right\rfloor$$

where $\lfloor \cdot \rfloor$ is the floor function. Second, the selection of the weight factors $a_j$ can be used to give more importance to certain scales if one is interested in preserving a certain spatial frequency. For these purposes, each scale has generally been given equal importance, which requires something of the form, $a_j = L^{j-1}$. Also, the operator q can be adjusted to include normalization of each coefficient map, which has been done in these simulations. Specifically, $$q(A) = \frac{1}{\max a_{i,j}} \begin{bmatrix} & \vdots & \\ \cdots & |a_{i,j}| & \cdots \\ & \vdots & \end{bmatrix}$$

where $a_{i,j}$ is the i,j-th element of the matrix A. Finally, another option is that instead of linearly combining each scale, one could employ a product or some other non-linear operator to combine the scales. However, as mentioned above, a linear combination has been found to work well, and thus it has been used throughout this description.

Figure 7:
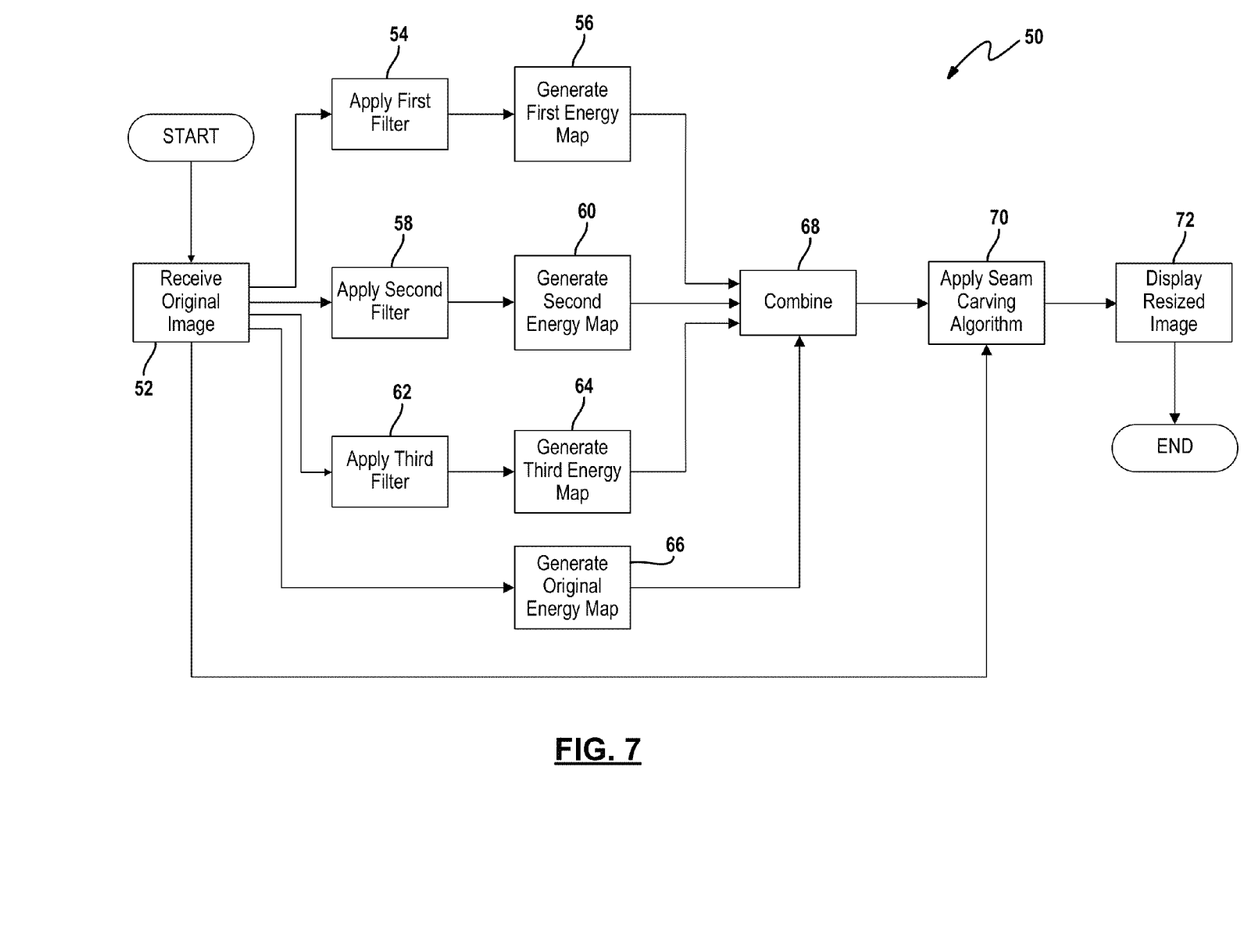
FIG. 7 is a flow diagram of an alternative embodiment of the computer-implemented method for resizing an image using a seam carving technique according to the present disclosure.

FIG. 7 presents a more general illustration of the computer-implemented method for resizing an image using a seam carving algorithm according to the present disclosure and is now described in further detail. The method 50 begins at 52, by receiving an original image. The image may be received from an image capturing device (for example only, a camera). At 54, a first filter is applied to the original image creating a first filtered image. The first filter may be a wavelet transform, a high pass filter, a low pass filter, a Gabor filter, a Roberts mask, or any other filter known to one skilled in the art. The first filter might also be the backward-energy seam carving filter or the forward-energy seam carving filter previously described. The first filtered image has a different scale than the original image. At 56, a first energy map is generated from the first filtered image. The first energy map describes characteristics of the first filtered image relating to the characteristics that the first filter highlights (for example only, textures and objects). The energy map displays the energy of the pixels in relation to one another based on the characteristics highlighted by the filter. The higher energy pixels occur where there are transitions within the image.

At 58, a second filter is applied to the original image creating a second filtered image. The second filter may be may be different from the first filter to highlight different characteristics in the original image. Similar to the first filtered image, the second filtered image will have a scale different than the original image. However, the scale of the second filtered image may be different than the scale of the first filtered image. At 60, a second energy map is generated from the second filtered image.

At 62 a third filter is applied to the original image creating a third filtered image. The third filter may be different from the first and second filters. A scale of the third filtered image will be different than the scale of the original image and may be different than the scales of the first and the second filtered images. At 64 a third energy map is generated from the third filtered image. At 66, an original energy map is generated from the original image. The original energy map has a scale that is the same as the scale for the original image.

At 68, the first, second, and third energy maps are combined with the original energy map to generate a composite image. As previously described in FIG. 1, the energy maps could be linearly combined by doubling the resolution of the lowest resolution energy map, applying an averaging filter, and mathematically summing the pixels to the next lowest resolution energy map. However, the energy maps do not need to be combined in linearly. The energy maps may be combined in a linear or non-linear process. For example, instead of linearly combining each scale, a product or some other non-linear operator could be employed to combine the energy maps.

At 70 the seam carving algorithm is applied to the composite image and the original image to generate the resized image. The seam carving algorithm evaluates the composite image for high energy pixels, selects a seam for deletion, and deletes the selected seam from the original image. The optimum path is generated using the composite image from above and traversing from the bottom edge (or right edge) back to the top edge (or left edge), maintaining a connected path and selecting the minimum value at each row (or column). This path of pixels is the seam and is removed from the original image. The process then starts over, continuing until the desired resolution is met and the resized image is generated. At 72, the resized image is displayed. The resized image may be displayed on an image display device (for example only, a cell phone).

Figure 8:
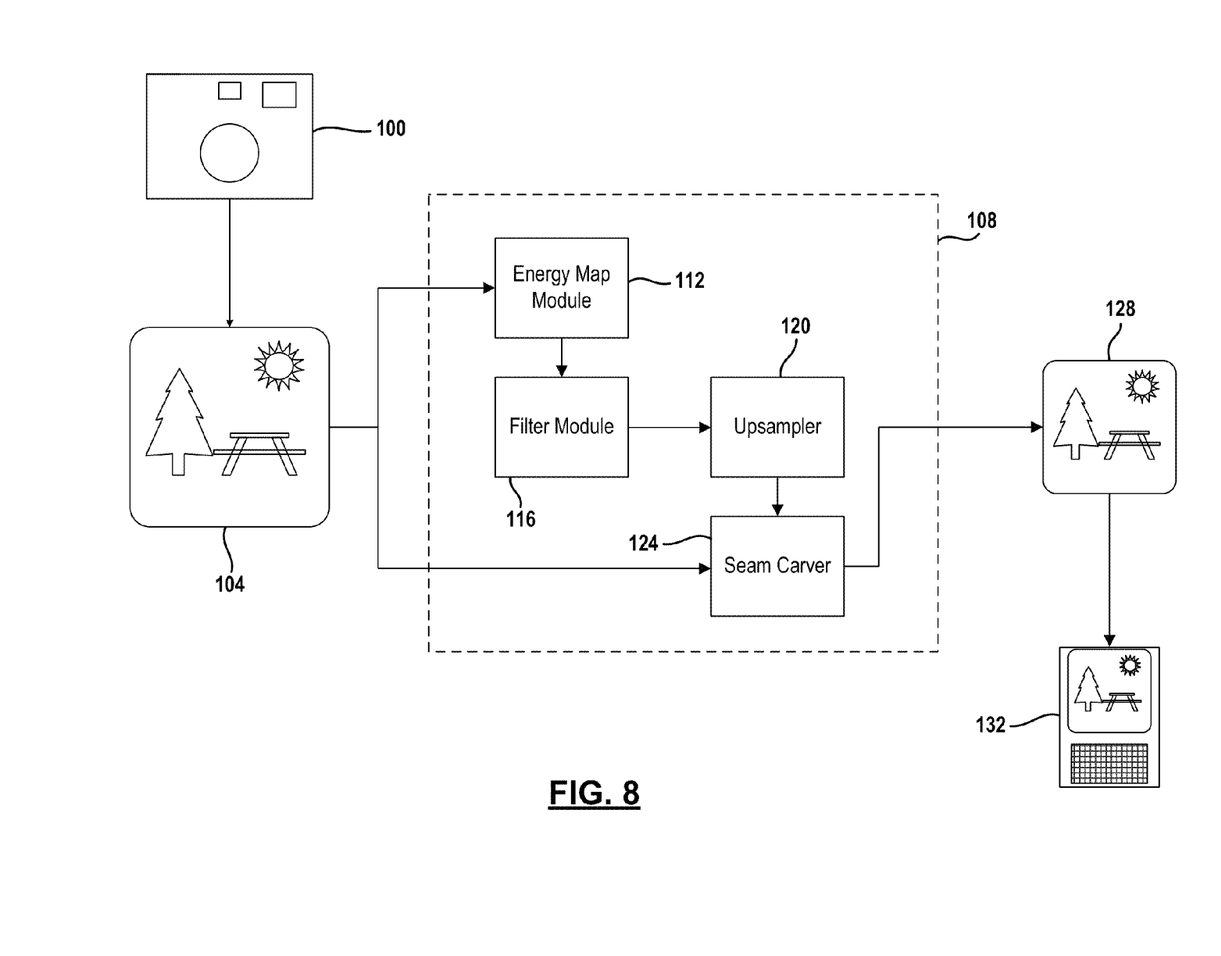
FIG. 8 is a block diagram of an exemplary embodiment a system for implementing the seam carving technique according to the present disclosure.

FIG. 8 illustrates a system that implements the generalized multiscale seam carving method to resize an image. The system generally comprises an image capturing device 100, a computer 108, and an image displaying device 132. For example, in FIG. 8, a camera 100 represents the image capturing device 100 and takes a picture producing an original image 104. The original image 104 is processed through the computer 108. The computer 108 further comprises an energy map module 112, a filter module 116, an upsampler 120, and a seam carver 124. The energy map module 112 measures the energies of the pixels in the original image and derives an original energy map. The energy map module 112 sends the original energy map to the filter module 116. The filter module 116 applies a wavelet transform filter to the original energy map deriving a first energy map. The scale for the first energy map is half the scale for the original energy map. The filter module 116 then applies the wavelet transform filter to the first energy map deriving the second energy map. The scale for the second energy map is half the scale for the first energy map. The filter module 116 sends the original energy map, first energy map, and second energy map to the upsampler 120. The upsampler 120 doubles the resolution of the second energy map and applies an averaging filter creating an upsampled energy map. The energies of the pixels of the upsampled energy map are mathematically summed to the energies of the pixels of the first energy map creating a combined energy map. The upsampler 120 doubles the resolution of the combined energy map and applies an averaging filter creating an upsampled combined energy map. The energies of the pixels of the upsampled combined energy map are mathematically summed to the energies of the pixels of the original energy map to create a composite image. The upsampler 120 sends the composite image to a seam carver 124. The seam carver 124 defines low energy seams in the composite image that have an energy below a predetermined threshold (for example, 25% of the largest energies) and locates the seams in the original image 104 that correlate to the low energy seams in the composite image. The seam carver 124 then removes at least one of the seams from the original image 104 creating a resized image 128. The computer 108 sends the resized image 128 to the image displaying device 132 (for example, a cellular telephone).

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for resizing an image using a seam carving algorithm, comprising:
   measuring, by a processor executing on a computing device, energy levels of pixels in an original image to derive an original energy map;
   applying, by the processor, a filter to the original energy map to derive a first energy map having quantities scaled different than the original energy map;
   iteratively applying, by the processor, the filter N times, starting with the first energy map, to an energy map resulting from an immediately preceding iteration;
   combining, by the processor, the resulting energy maps with the original energy map to form a composite image; and
   selectively deleting, by the processor, a seam from the original image using a seam carving algorithm with input from the composite image, thereby yielding a resized image.

2. The method of claim 1 wherein applying a filter further comprises selecting a filter from at least one of a Gabor filter, a Roberts mask or a wavelet transform.

3. The method of claim 1 wherein applying a filter further comprises performing a cross correlation between the filter and the original image.

4. The method of claim 1 further comprises linearly combining quantities of the resulting energy maps together.

5. The method of claim 1 wherein combining the resulting energy maps further comprises multiplying quantities of the resulting energy maps together.

6. The method of claim 1 wherein combining the resulting energy map further comprises upsampling each of the resulting energy maps to a resolution that matches the original energy map.

7. The method of claim 1 further comprises determining the seam by finding a path of minimum cost from one end of the composite image to an opposing end of the composite image, where the seam having only one pixel per row or column.

8. The method of claim 1 further comprises displaying the resized image on a display of the computing device.

9. A computer-implemented method for resizing an image using a seam carving algorithm, comprising:
   measuring, by a processor executing on a computing device, energy levels of pixels in an original image to derive an original energy map;
   applying, by the processor, a filter to an original energy map to derive a first energy map having a scale less than the original energy map;
   iteratively applying, by the processor, the filter N times, starting with the first energy map, to an energy map from an immediately preceding iteration;
   upsampling, by the processor, each of the energy maps to a resolution that matches the original energy map;
   combining, by the processor, the upsampled energy maps with the original energy map to form a composite image;
   identifying, by the processor, a seam by finding a path in the composite image having lowest energy quantities from one end of the composite image to an opposing end of the composite image, where the seam having only one pixel per row or column; and selectively deleting, by the processor, the identified seam from the original image, thereby yielding a resized image.

10. The method of claim 9 wherein applying a filter further comprises selecting a filter from at least one of a Gabor filter, a Roberts mask or a wavelet transform.

11. The method of claim 9 wherein applying a filter further comprises performing a cross correlation between the filter and the original image.

12. The method of claim 9 wherein applying a filter further comprises using a filter bank defined as $$B_{fwd} = \left\{ \begin{bmatrix} 0 & -1 & 0 \\ 1 & 0 & 0 \\ 0 & 0 & 0 \end{bmatrix}, \begin{bmatrix} 0 & 0 & 0 \\ 1 & 0 & -1 \\ 0 & 0 & 0 \end{bmatrix}, \begin{bmatrix} 0 & 1 & 0 \\ 0 & 0 & -1 \\ 0 & 0 & 0 \end{bmatrix} \right\}$$

with $$\rho_R = [1, 1, 0]^T$$
$$\rho_C = [0, 1, 0]^T$$
$$\rho_L = [0, 1, 1]^T.$$

13. The method of claim 9 further comprises linearly combining quantities of the resulting energy maps together.

14. The method of claim 9 wherein combining the resulting energy maps further comprises multiplying quantities of the resulting energy maps together.

15. The method of claim 9 wherein combining the resulting energy map further comprises upsampling each of the resulting energy maps to a resolution that matches the original energy map.

16. The method of claim 9 further comprises repeating the steps of identifying a seam and selectively deleting the identified seam until the resized image is a desired resolution.

17. The method of claim 9 further comprises displaying the resized image on a display of the computing device.

18. A computer-implemented system for resizing an image using a seam carving technique, comprising:
   an energy map module configured to receive an original image and operates to measure energy levels of pixels in the original image to derive an original energy map;
   a filter module operate to apply a filter to the original energy map to derive a first energy map having a scale less than the original energy map and iteratively apply the filter N times, starting with the first energy map, to an energy map from an immediately preceding iteration;
   an upsampler that upsamples each of the energy maps to a resolution that matches the original energy map and linearly combines the upsampled energy maps with the original energy map to form a composite image; and
   a seam carver operates to identify at least one seam by finding a path in the composite image having lowest energy quantities from one end of the composite image to an opposing end of the composite image and selectively delete the identified seam from the original image to yield a resized image, wherein the energy map module, the filter module, the upsampler and the seam carver are embodied as computer instructions executed by a processor of a computing device.

19. The computer-implemented system of claim 18 wherein the filter is selected from a group consisting of a Gabor filter, a Roberts mask or a wavelet transform.

20. The computer-implemented system of 18 wherein the seam carver operates to display the resized image on a display of the computing device.

* * * * *